United States Patent [19]
Rohr

[11] Patent Number: 5,573,363
[45] Date of Patent: Nov. 12, 1996

[54] FLOATING CONVEYOR SYSTEM

[76] Inventor: Jochen Rohr, 1 Field La., Cincinnati, Ohio 45208

[21] Appl. No.: 262,938

[22] Filed: Jun. 21, 1994

[30] Foreign Application Priority Data

Jun. 22, 1993 [DE] Germany ............................. 9309251 U

[51] Int. Cl.$^6$ ........................... B63B 27/00; B65G 67/60
[52] U.S. Cl. ................................... 414/138.9; 414/138.7; 414/139.6; 414/140.2; 414/140.9
[58] Field of Search .............................. 414/137.1, 138.7, 414/139.4, 139.6, 139.9, 140.2, 140.8, 140.9, 137.7, 137.8, 138.5, 138.9, 138.6, 139.1, 139.3; 198/588, 594, 589; 114/263

[56] References Cited

U.S. PATENT DOCUMENTS

| | | | |
|---|---|---|---|
| 664,892 | 1/1901 | Paul | 414/138.6 |
| 2,173,177 | 9/1939 | Menk | 198/594 |
| 2,242,206 | 5/1941 | Bisset | 414/139.4 |
| 2,628,727 | 2/1953 | Anschutz | 414/139.1 |
| 2,684,750 | 7/1954 | Mercier | 198/589 |
| 3,792,589 | 2/1974 | Sayles | 405/70 |
| 4,646,906 | 3/1987 | Wilcox, Jr. et al. | 198/589 |
| 4,813,815 | 3/1989 | McGehee | 405/202 |
| 5,234,094 | 8/1993 | Weyermann et al. | 198/588 |
| 5,377,810 | 1/1995 | Lehtonen et al. | 198/303 |

FOREIGN PATENT DOCUMENTS

| | | | |
|---|---|---|---|
| 573255A1 | 12/1993 | European Pat. Off. | 198/589 |
| 0031919 | 3/1981 | Japan | 405/71 |

*Primary Examiner*—Karen B. Merritt
*Assistant Examiner*—Douglas A. Hess
*Attorney, Agent, or Firm*—Wood, Herron & Evans, P.L.L.

[57] ABSTRACT

A floating conveyor system includes a number of serially interconnected conveyor units for transferring sand, gravel and other material from a floating dredge to a land based station for processing. Each conveyor unit is supported by pontoons or floats over substantially the entire length of the unit. Furthermore, the individual conveyor units are joined by a unique coupling system which provides a universal-type cardan joint to permit movement of the respective units without capsizing or disconnecting. As a result, the floating conveyor system provides a more stable transfer, offers a safer catwalk for personnel passage, and can be easily lengthened or shortened by adding or subtracting additional conveyor units without pulling the entire system ashore.

16 Claims, 6 Drawing Sheets

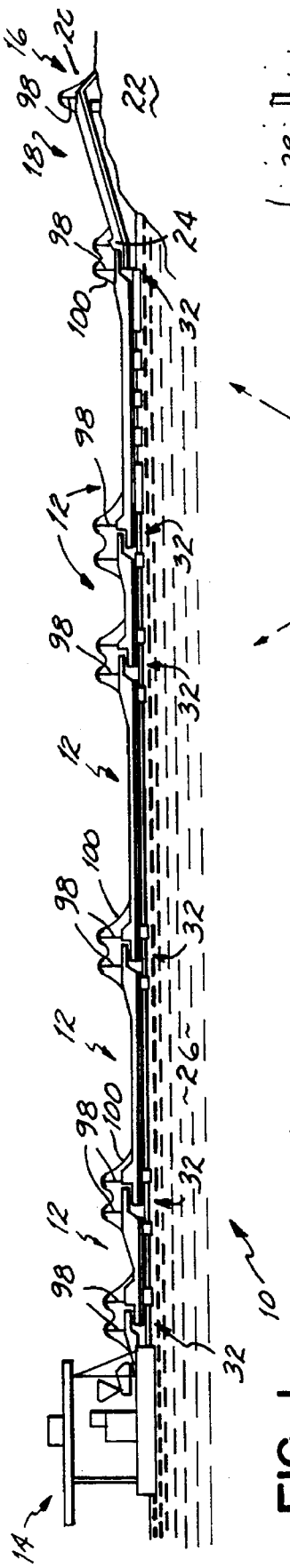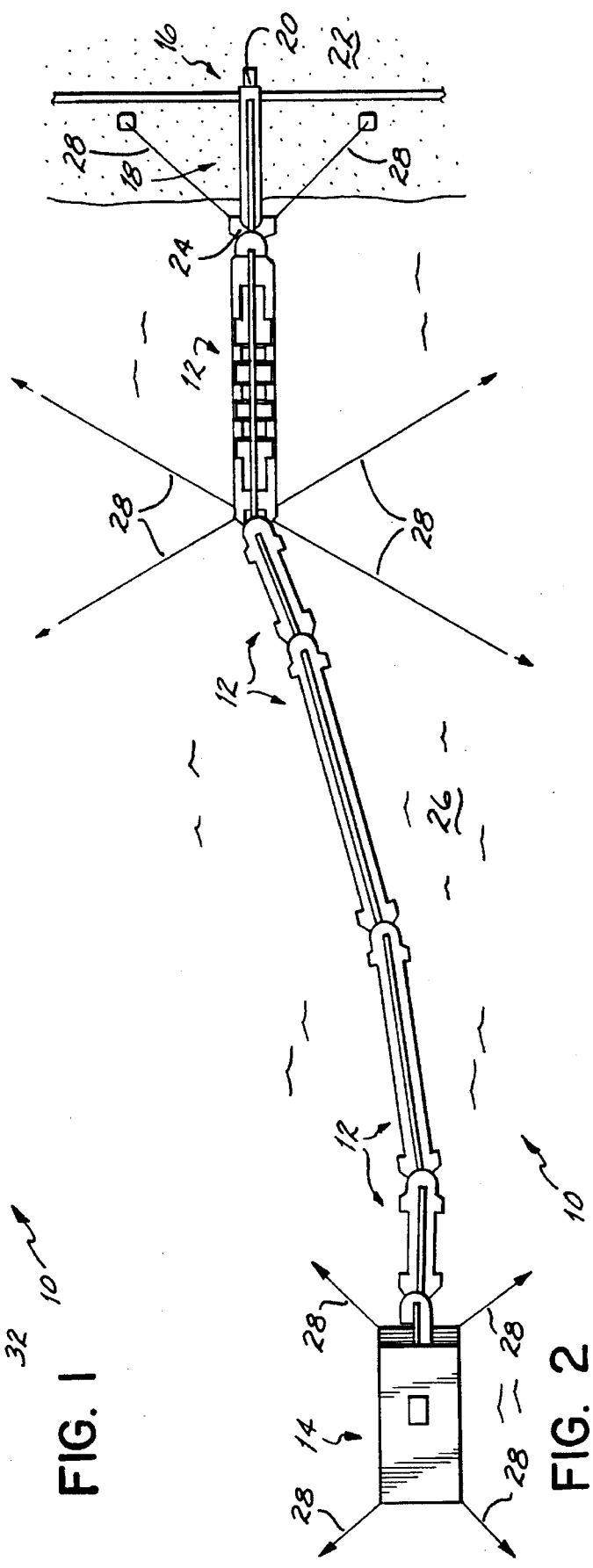

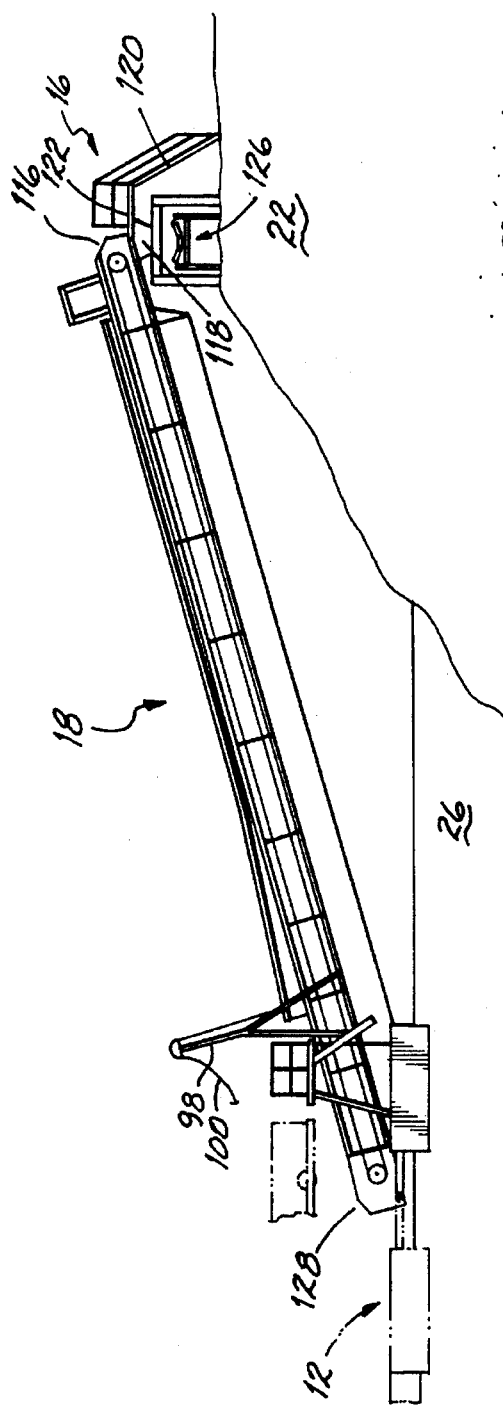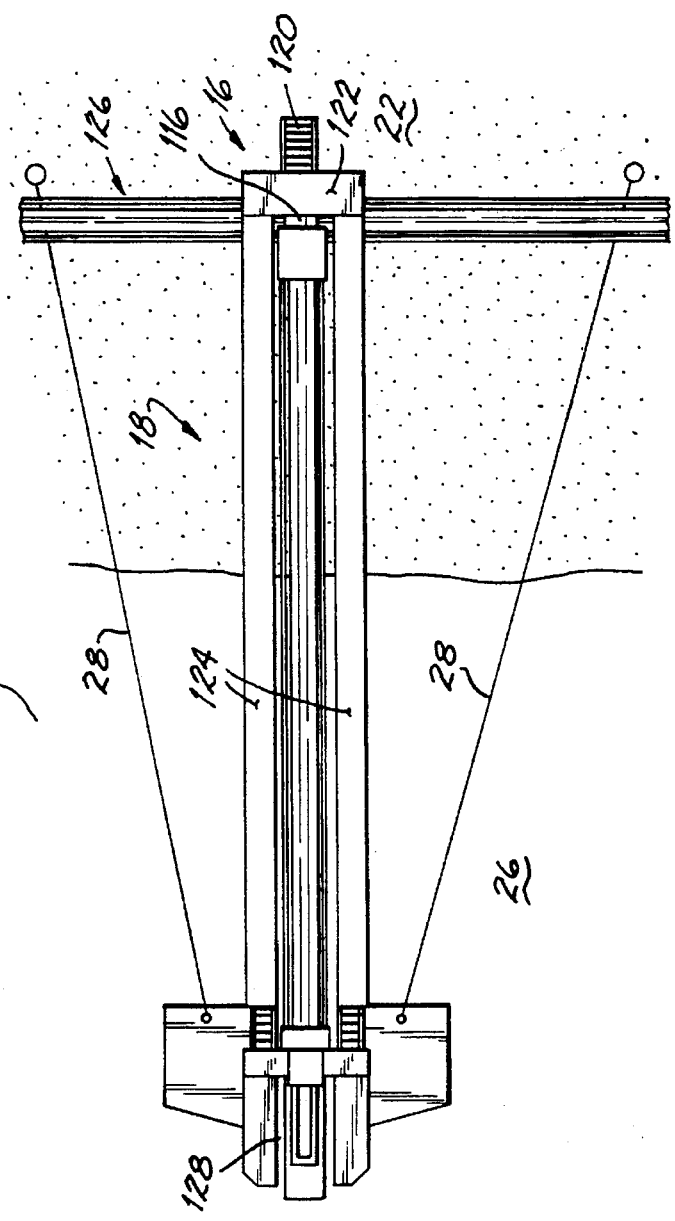
FIG. 12
FIG. 13

FLOATING CONVEYOR SYSTEM

BACKGROUND OF THE INVENTION

This invention relates to a floating conveyor system, and more particularly, to a system for transporting sand and gravel from a floating dredge to a land based station.

Floating conveyor systems are useful to transport sand and gravel from a floating dredge or winning machine across a body of water to a land based station such as a raw gravel pile or gravel processing site. Examples of winning machines or dredges include clam shell dredges, bucket ladder dredges, and the like.

Currently, floating conveyor systems include multiple conveyor units which are coupled together to form an extended floating conveyor system for bridging the body of water and transporting the sand, gravel or other dredged material. These current systems require one end of each conveyor unit to be supported on a float assembly consisting of typically six or eight individual pontoons. The float end of each conveyor unit includes a ball bearing slewing ring beneath which is positioned one end of the conveyor for transferring the material. The ball bearing slewing ring is essentially an enlarged annular conduit having a bearing ring at an upper edge thereof. The bearing ring is designed to support the trailing end of an adjacent conveyor unit coupled thereto. The leading and trailing ends of adjacent conveyor units are coupled so that the trailing end of one conveyor unit is supported upon the bearing ring at the leading end of an adjacent conveyor unit. The sand and gravel travels on the conveyor unit upwardly toward the trailing end of the conveyor unit and then is deposited off of the trailing end of the conveyor down through the ball bearing slewing ring of the next unit and onto the leading end of the conveyor and is then transported upwardly toward the trailing end of that unit. Each conveyor unit only has floats at the leading end of the unit underneath the ball bearing slewing ring.

This prior embodiment of a floating conveyor system has numerous disadvantages. Floating conveyor systems of this type must have catwalks and connection ways for personnel to travel along the conveyor system between the dredge and the land based station. The individual conveyor units in the prior art system are configured so that the trailing end of a conveyor pivots atop the bearing ring on the adjacent conveyor unit. The slewing motion or pivoting of the conveyor units at their intersections presents significant hazards for personnel walking from one unit to the next so that current floating conveyor systems do not provide an adequately safe walking area, connecting way, or catwalk. Furthermore, the catwalks must conform with safety and governmental regulations.

Another problem associated with floating conveyor systems as previously described is that the trailing end of each arriving belt must be placed on the float assembly at the leading end of the adjacent unit with the sand and gravel being transferred from one to the other through the ball bearing slewing ring structure. This arrangement creates a high profile and unstable configuration such that loads upon the conveyor system due to wind forces or wave motions create shear forces on the slewing ring. The juncture between adjacent conveyor units at the slewing ring is not adapted to withstand twisting, torsional or shear forces. As a result, such forces may cause the system to snap apart or collapse.

Another considerable disadvantage with prior systems is that the system can only be lengthened or shortened at great expense with considerable time and effort. All of the conveyor units along with the floating dredge must be pulled ashore and the conveyor belts removed with a suitable crane in order to add or remove a conveyor unit. Typically, this task can only be performed during clement weather conditions and is still very time consuming and costly.

A further disadvantage of prior systems is the tendency for the conveyor to clog and become overloaded. The sand and gravel is transferred from one unit to the next through a restricted orifice on the slewing ring. Often larger rocks and dredged material become jammed and clogged while passing through the slewing ring. In addition to the obvious problem of interrupting the flow of material on the system and the requirement of unclogging the blockage, the added weight on the slewing ring platform produces a risk of capsizing the floating equipment.

SUMMARY OF THE INVENTION

It has been a primary objective of this invention to provide an improved floating conveyor system for transferring material from a floating dredge to a land based station.

It has been a further objective to provide such a system which can be easily adjusted in length without bringing the conveyor system ashore.

It has been a yet further objective to provide such a system which achieves optimum stability and will not capsize, sink or break apart under a variety of load, wind and wave conditions.

It is a still further objective to provide such a system which incorporates a safe and convenient catwalk for personnel movement therealong.

These and other objectives of the invention have been attained by a floating conveyor system constructed from multiple, serially connected individual conveyor units in which each unit has a conveyor for transporting the dredge material thereon. The floating conveyor units according to this invention are cardanically joined together. The unique coupling between adjacent conveyor units includes a drawbar extending from the terminal end of each unit. At each coupling, one of the drawbars is pivotally joined to one conveyor unit whereas the other drawbar is rigidly fixed to the adjacent conveyor unit. The two drawbars are then pinned together for pivotal movement within a plane perpendicular to the plane in which the pivotally connected drawbar pivots. In other words, the coupler permits both horizontal and vertical movement in a non-linear connection. As a result, the cardanically joined conveyor units provide a universal-type coupler to permit multiple degrees of freedom of movement at the joint. As used herein and in the appended claims, the term "cardan joint" and variations thereof refers to a universal-type joint with at least two degrees of freedom and which transmits motion unchanged but does not require a linear connection.

The unique coupling between the individual conveyor units avoids the disadvantages associated with the ball bearing slewing ring and therefore enables the design of a safe catwalk section and mating of individual catwalks between the conveyor units. Each conveyor unit includes at least one float or pontoon, a portion of which supports the middle section of the conveyor unit to provide a more stable and reliable floatation system unlike prior art conveyor units which include a float only at one terminal end thereof. Preferably, each terminal end of the conveyor includes a widened bearing pontoon in order to provide an even more stable support at the important juncture between conveyor units. The floats may include a plurality of spaced pontoons providing a catamaran-type conveyor unit. The spaced pontoons are joined through a steel framework structure and are particularly useful for longer conveyor units ranging over 60 meters in length.

The floating conveyor system according to this invention offers many significant advantages over the prior art. For example, the conveyor system is significantly more stable and can withstand tensile and shear stresses produced by wind conditions, loading and wave motions to thereby significantly reducing the breaking, capsizing, or shearing apart of the system. Shear force and torsional force transmissions which lead to capsizing are completely absorbed through the cardan joint coupling. Furthermore, the pontoon designed floatation considerably reduces ice pressure resulting from freezing waterways thereby allowing larger portions of ice to flow between the spaced pontoons instead of being blocked and accumulating on one side of a larger individual float. Moreover, accident hazards are significantly minimized by the safe catwalks and connecting ways between the conveyor units. Significantly, the conveyor system can be easily and quickly adjusted without pulling the conveyor system and dredge machine ashore for replacement, addition, or removal of specific conveyor units.

DESCRIPTION OF THE DRAWINGS

The objectives and features of the invention will become more readily apparent from the following detailed description taken in conjunction with the accompanying drawings in which:

FIG. 1 is a side elevational schematic view of a floating conveyor system connecting a floating dredge to a land base station according to this invention;

FIG. 2 is a top plane view of the system of FIG. 1;

FIG. 12 is a side elevational schematic view of a water-land conveyor unit according to this invention;

FIG. 13 is a plan view of the unit of FIG. 12; and

DETAILED DESCRIPTION OF THE INVENTION

Figure 3:
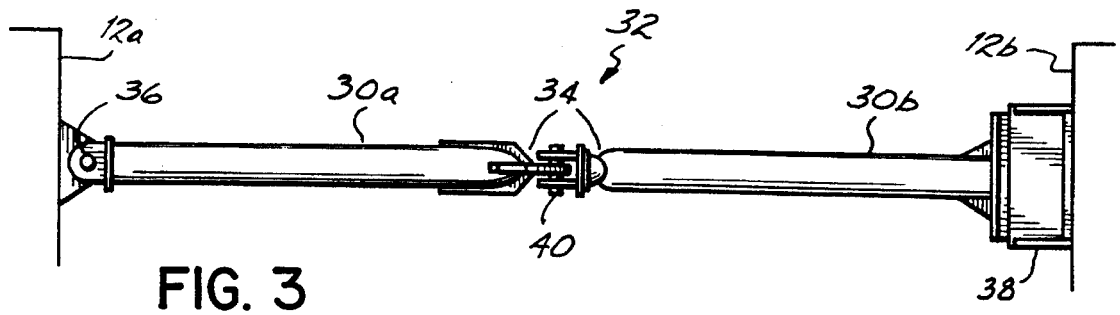
FIG. 3 is a side elevational view of the coupling between adjacent conveyor units.

FIGS. 1 and 2 show a floating conveyor system 10 according to this invention wherein the system includes a number of independent floating conveyor units 12 serially connected for transferring sand, gravel and other material between a floating dredge or winning machine 14 and a land based station 16. As shown in FIGS. 1 and 2, the conveyor units 12 according to this invention can be constructed of different lengths ranging typically from about 25 meters up to approximately 250 meters. The dredge 14 can be of any suitable type as known by one of ordinary skill in the art such as a clam shell dredge, a bucket ladder dredge, or the like. It will be appreciated by one of ordinary skill in the art that the number of individual conveyor units and their respective sizes are shown in the drawings and described in the specification for exemplary purposes only and should not be considered a limitation upon the claims of this invention.

The floating conveyor system 10 according to this invention is connected to the land based station 16 by a water-land conveyor unit 18 having a trailing end 20 thereof supported upon land 22 and a leading end 24 thereof floating upon water 26. The water-land conveyor unit 18, the dredge 14, and other specific locations along the system 10 can be securely anchored to the land 22 or within the water 26 by the aid of cables 28 as shown in FIG. 2.

Figure 4:
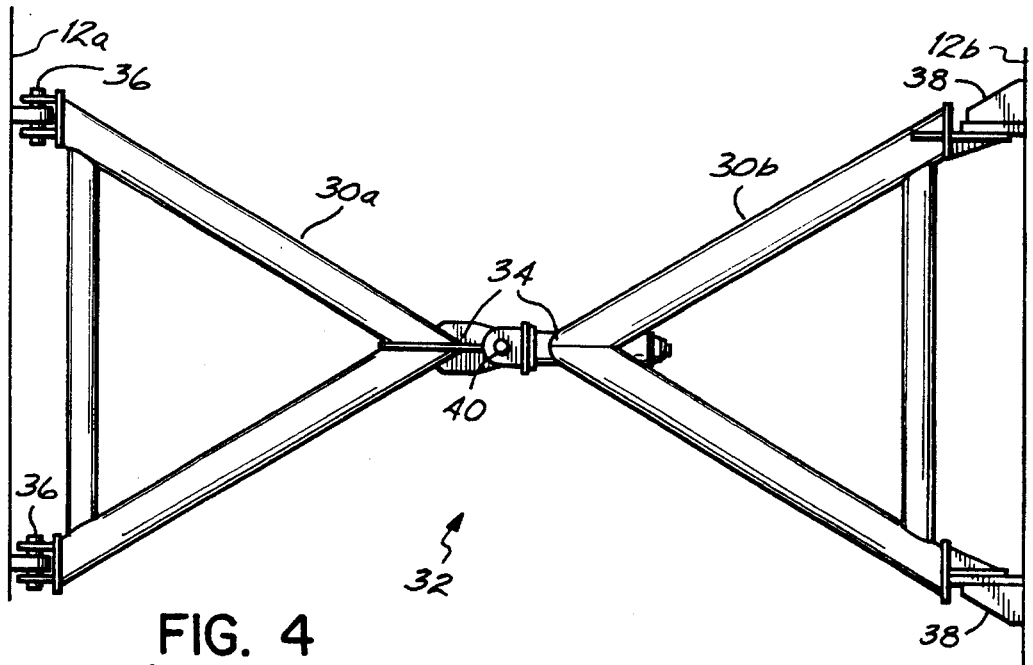
FIG. 4 is a top plan view of the coupling of FIG. 3.

As shown in FIGS. 3 and 4, the individual conveyor units 12 according to this invention are uniquely coupled together by means of drawbars 30 which in combination provide a cardanically joined universal-type coupler 32. Furthermore, the conveyor units 12 may be coupled to the land based station 16 and to the floating dredge 14 with the coupler 32 of this invention.

In a presently preferred embodiment of the coupler 32, each drawbar 30 is generally triangularly shaped and connected together proximate an apex of each triangle. A first drawbar 30a is pivotally hinged as with pins 36 to a first conveyor unit 12a; whereas, a second drawbar 30b is fixedly secured to an adjacent second conveyor unit 12b as by mounts 38. The pivotal coupling of the first drawbar 30a to the first conveyor unit 12a permits the drawbar 30a to pivot within a first plane generally perpendicular to the axis of the pins 36. The apex 34 of each triangular shaped drawbar 30a, 30b of a coupler 32 according to this invention are likewise pivotally joined together as with a pin 40. The pin 40 between the drawbars 30a, 30b permits movement within a second plane generally perpendicular to the axis of the pin 40. It will be appreciated that the respective axes of the pins 36, 40 are generally perpendicular to each other and that the respective planes within which the pivotal movement is permitted between the first and second drawbars 30a, 30b and between the first drawbar 30a and the first conveyor unit 12a are likewise generally perpendicular with respect to each other.

As a result of the coupler 32 of this invention, the conveyor units 12 of this system are cardanically joined to permit movement between adjacent conveyor units 12 without disconnection or disruption of the system 10. For example, the coupler 32 permits both vertical and horizontal movement between the joined conveyor units 12 without disruption of the conveyor system 10 operation.

Figure 14:
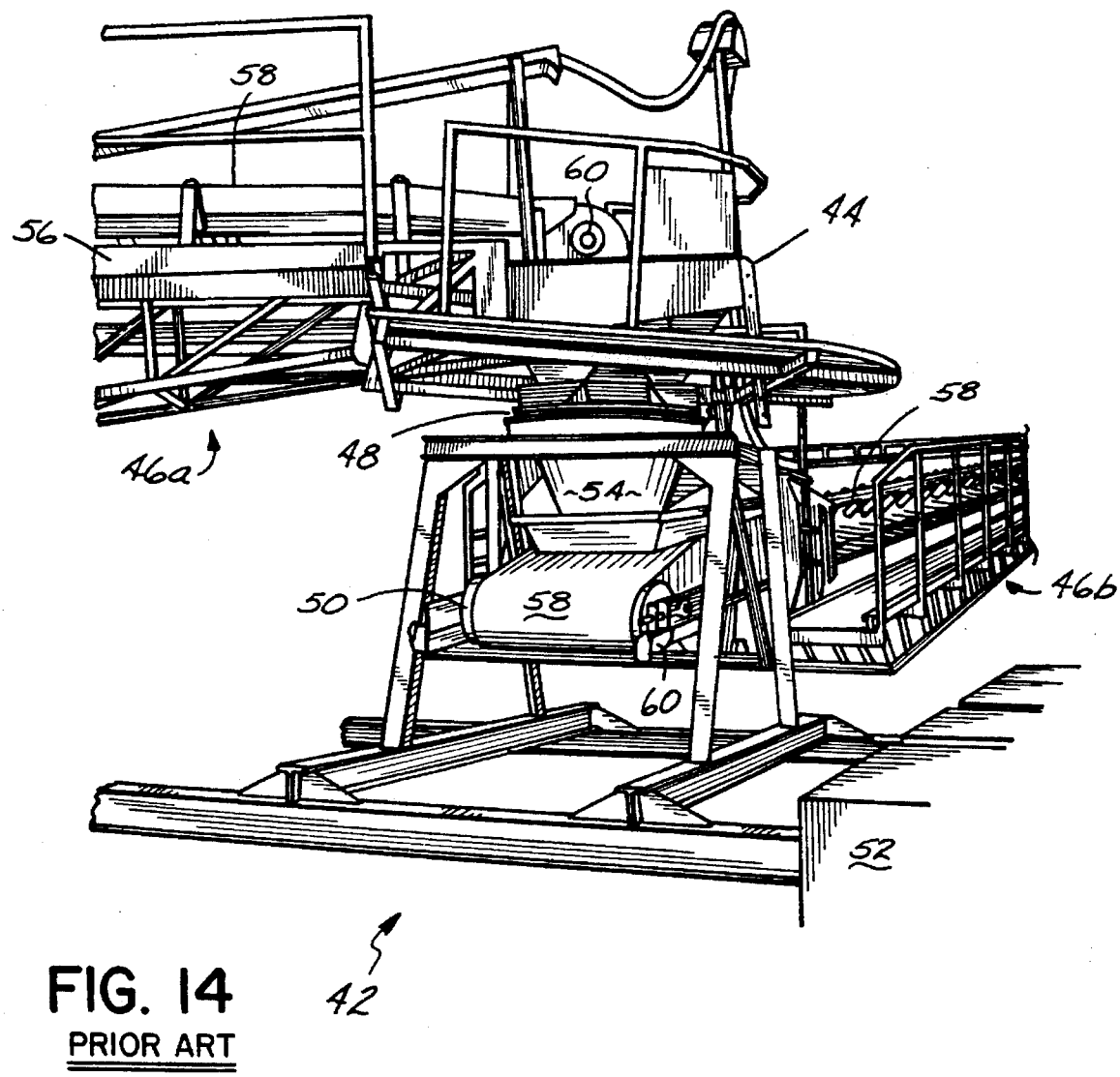
FIG. 14 is a perspective view of the juncture between adjacent prior art conveyor units.

A prior art system 42 is shown in FIG. 14 in which a trailing end 44 of a first conveyor unit 46 is supported atop a ball bearing slewing ring 48 at a leading end 50 of an adjacent conveyor unit 46. The connection between the prior art conveyor units 46, including the ball bearing slewing ring 48, permits movement between the joined conveyor units 46 only within a generally horizontal plane. Therefore, such a system 42 is particularly susceptible to wind, wave or other shear forces which may capsize or damage, or interrupt operation of the conveyor system 42. In the prior art system 42, the trailing end 44 of each conveyor unit 46 is solely supported upon the leading end 50 of the adjacent conveyor unit 46. A float 52 to support the conveyor unit 46 is positioned only at the leading end 50 of each conveyor unit 46, Therefore, the support and floatation of each conveyor unit 46 is interdependent upon the adjacent conveyor units 46 so that if one unit twists, sinks or capsizes each other unit in the system 42 is likewise susceptible to failing.

As a result, the conveyor units 46 are particularly susceptible to capsizing if, for example, the material transferred upon an arriving conveyor at the trailing end 44 thereof is clogged or jammed within a restricted orifice 54 of the ball bearing slewing ring 48. The accumulating sand and gravel often produces a capsized floating conveyor unit 46 which in turn capsizes each interconnected conveyor unit 46.

The prior art system 42 includes a lateral catwalk 56 extending alongside a conveyor 58 which is supported by a plurality of rollers 60. However, at the connection between conveyor units 46, the trailing end 44 of the conveyor unit 46 is vertically displaced higher than the catwalk 56 at the leading end 50 of the adjacent unit 46 thereby presenting a difficult and hazardous passage from one conveyor unit to the next.

FIGS. 5–8 show a first presently preferred embodiment of a conveyor unit 62 according to this invention. The conveyor unit 62 includes a conveyor 64 having an upper run 66 and a lower run 68 extending between a leading end roller 70 and a trailing end roller 72. A trailing end 74 of the conveyor 64 and trailing end roller 72 are elevated relative to a leading end 76 of the conveyor 64. The sand, gravel and other material are carried on the upper run 66 of the conveyor 64 which is positioned over the lower return run 68. The trailing end 74 of the conveyor 64 is elevated so that it is positioned over the leading end 76 of an adjacent conveyor for depositing the material from the upper run 66 of an arriving conveyor onto the upper run 66 of a leaving conveyor. A general U-shaped trough 78 having an open end directed toward the trailing end 74 of the conveyor 64 is positioned proximate the leading end roller 70 over the upper run 66 of the conveyor 64 to collect and contain the material as it is deposited from the arriving conveyor onto the leaving conveyor without clogging or jamming.

The conveyor 64 is supported on a generally H-shaped frame 80 in which a crossbar 82 of the frame 80 extends between the upper and lower runs 66, 68 of the conveyor 64. The individual conveyor units 62 are serially joined with the coupler 32 previously identified with reference to FIGS. 3 and 4.

The conveyor unit 62 of this embodiment includes a pair of lateral floats 84 extending substantially the entire length of the unit 62 to support not only the end sections thereof but the middle section of the unit 62 also. As can be seen by comparing FIGS. 7 and 8, the conveyor unit 62 and floats 84 include widened sections 86 at each terminal end thereof at the area of transfer between adjacent conveyor units 62. The widened sections 86 at each end provide for added stability of the system 10 at the juncture between adjacent units 62 to withstand wind, wave, and other forces imparted to the system 10. The conveyor 64 accommodates belt widths up to and over 100 centimeters in width and is supported by a plurality of intermediate rollers 88 which may be canted to provide a contoured profile upper run for retaining the sand, gravel and other material thereon.

Figure 5A:
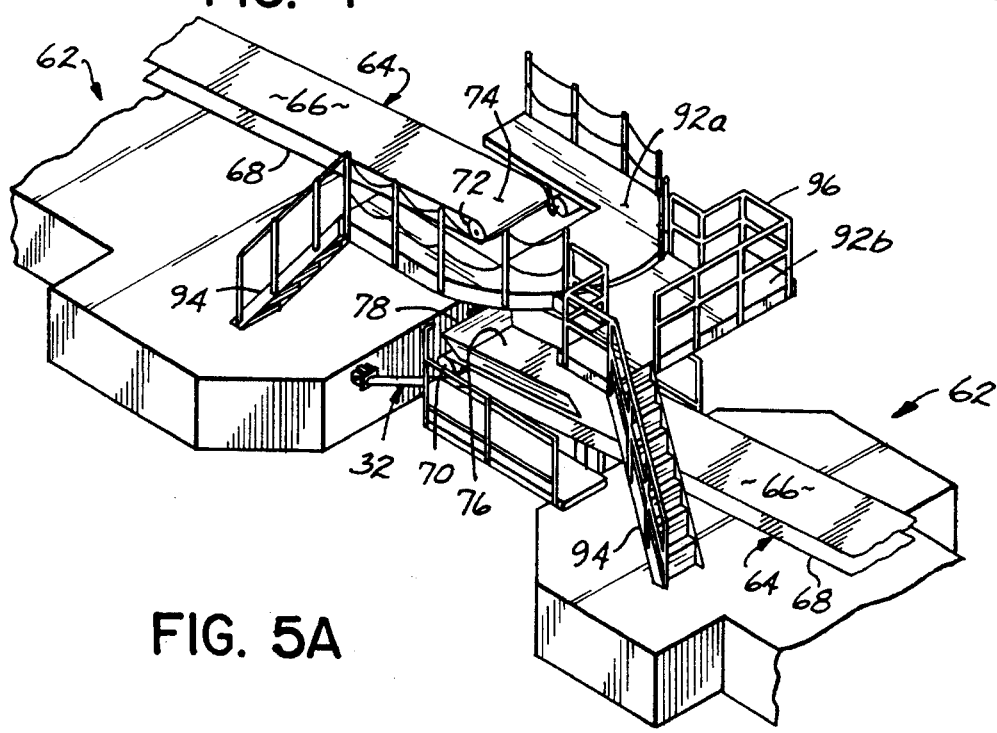
FIG. 5A is a perspective view of the juncture between adjacent conveyor units of the first embodiment of this invention.
Figure 5:
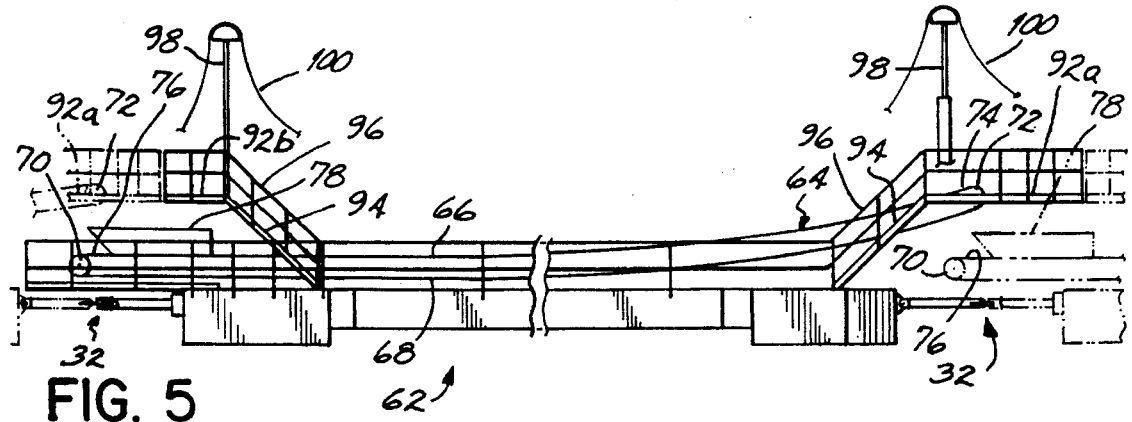
FIG. 5 is a side elevational schematic view of a first embodiment of a conveyor unit according to this invention.
Figure 6:
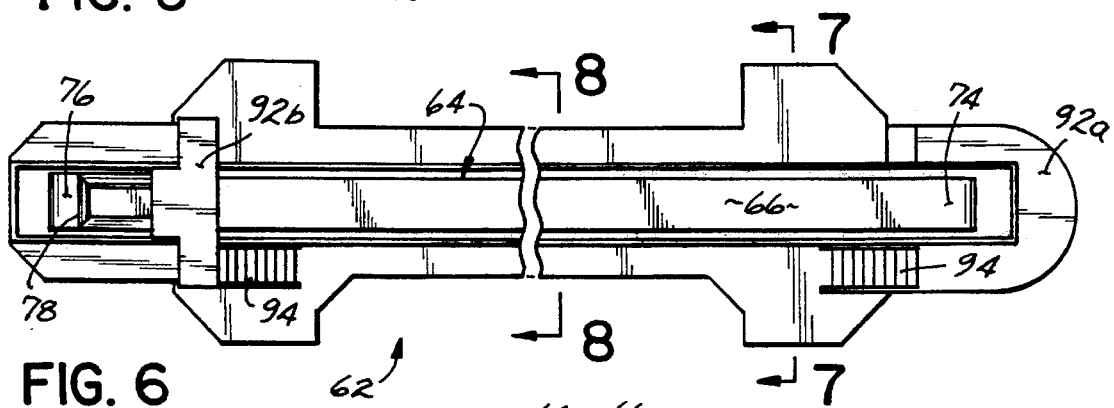
FIG. 6 is a top plan view of the unit of FIG. 5.
Figure 7:
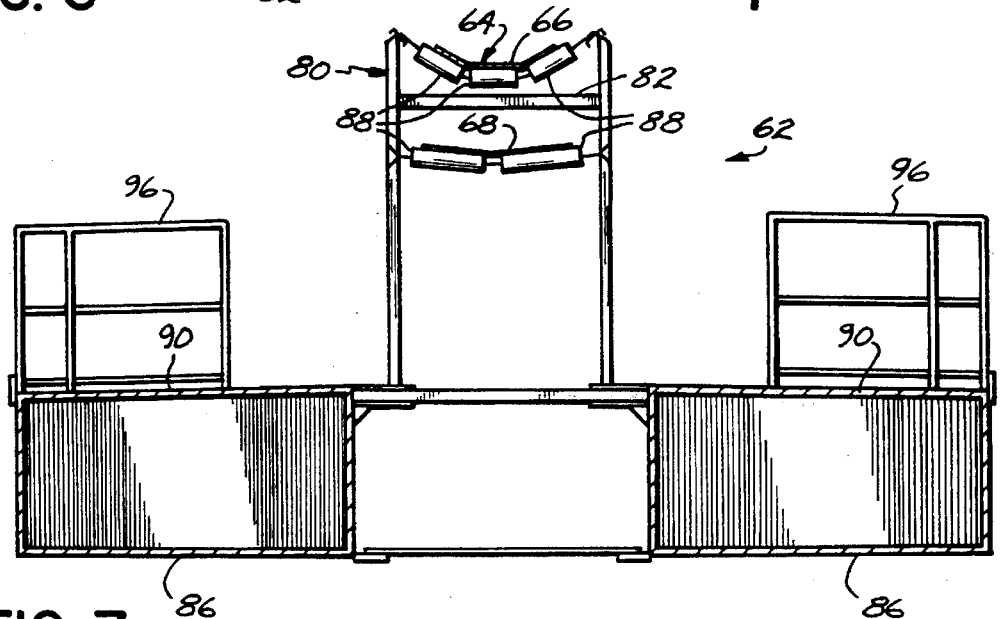
FIG. 7 is a cross-sectional view taken along line 7—7 of FIG. 6.
Figure 8:
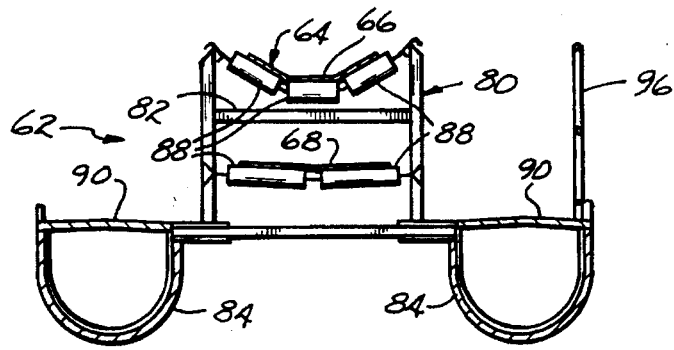
FIG. 8 is a cross-sectional view taken along line 8—8 of FIG. 6.

Arranged laterally with respect to the conveyor 64 on each unit 62 is a catwalk 90. For conveyor belt widths over 100 centimeters, a catwalk 90 may be provided for personnel passage on both lateral sides of the conveyor 64 as shown in FIGS. 6–8. An elevated platform 92 is provided for access and transfer between the catwalks 90 of adjacent units 62 at each terminal end of the conveyor unit 62. Each platform 92 is provided with a convenient stairway 94 and safety handrail 96. The platform 92a at the trailing end 74 of each conveyor unit 62 has a generally arcuate shape as shown in FIG. 5A for mating with the platform 92b at the leading end 76 of the adjacent conveyor unit. The arcuate shaped platform 92a provides for safe and convenient passage between the units 62 irrespective of the angular relationship between the adjacent units. Additionally, each floating conveyor unit 62 includes elevated masts 98 above which a power lead 100 is supported for providing power from the land based station 16 for the respective units 62 and the floating dredge 14.

Figure 9:
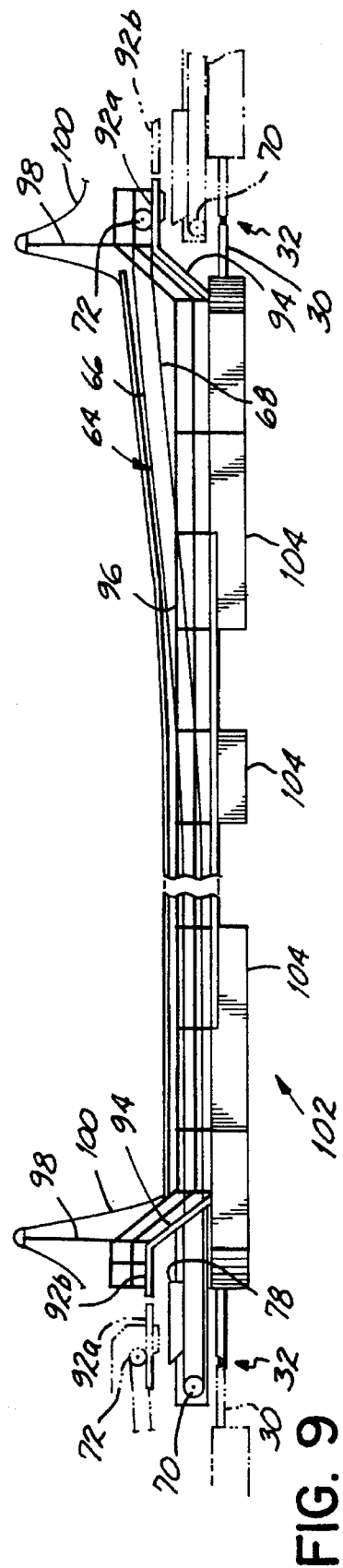
FIG. 9 is a side elevational view of a second embodiment of a conveyor unit according to this invention.
Figure 11:
FIG. 11 is a cross-sectional view taken along line 11—11 of FIG. 10.
Figure 10:
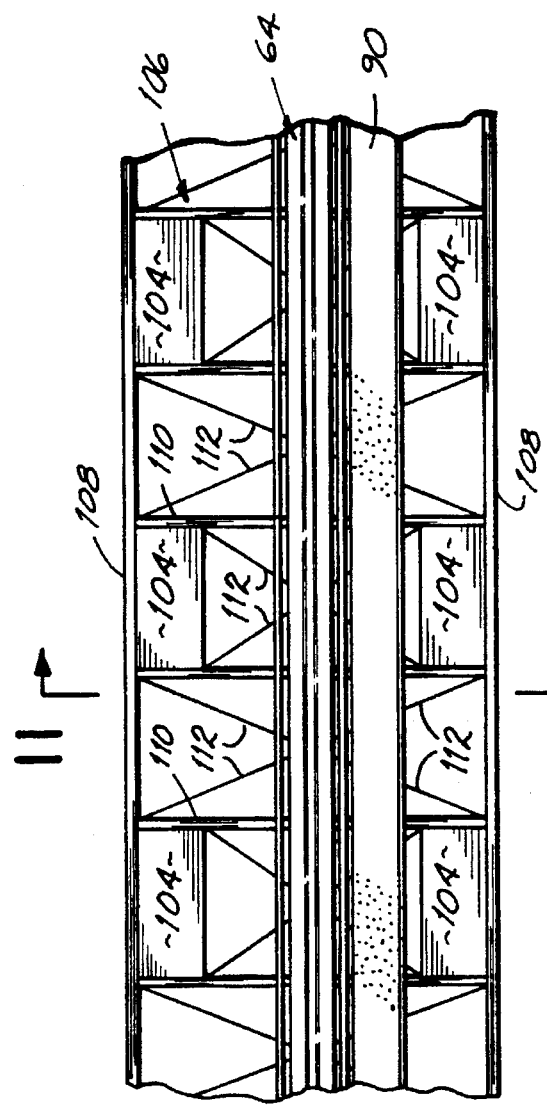
FIG. 10 is a partial plan view of the center section of the unit of FIG. 9.

A second presently preferred embodiment of a floating conveyor unit 102 according to this invention is shown in FIGS. 9–11 wherein like reference numerals are provided for elements in this embodiment common to the first embodiment of the invention. The conveyor unit 102 of the second presently preferred embodiment includes a plurality of individual, spaced pontoons or floats 104 spanning the length of the unit 102. The spaced configuration of the pontoons 104 of this embodiment fashion the unit 102 as a catamaran and are particularly useful for longer conveyor units than those of the first embodiment. For example, the first embodiment is particularly adapted for conveyor units having a length up to approximately 16 meters. Whereas, the catamaran design of the second embodiment is appropriate for conveyor units longer than approximately 60 meters. Furthermore, the catamaran design is particularly useful to prevent the accumulation of ice or other debris floating on the water 26 in that the ice or debris can pass beneath the conveyor unit 102 between the spaced pontoons 104 thereof. As a result, capsizing, sinking or other damage to the unit 102 as a result of the accumulation of ice or other debris is avoided.

The enlarged and spaced floats 104 of the catamaran style unit 102 offer better stability at its ends 74, 76 where the conveyor 64 transfers the material to the adjacent unit. As shown in FIG. 10, the pontoons 104 of the unit 102 are spaced on either side of the conveyor 64 and are spaced longitudinally with respect to each other. The pontoons 104 of the unit 102 are joined together by structural framework 106 including pipes or beams 108 extending lengthwise at the outermost lateral edges of the unit 102 and crossbeams 110 extending between the lateral beams 108 at each edge of the pontoons 104. Crossbeams or crosswires 112 are also provided between opposite lateral sides of adjacent pontoons 104 to provide added structural support and strength to the unit 102.

FIGS. 12 and 13 show the water-land conveyor unit 18 connecting the floating conveyor system 10 to the land based station 16 and spanning the shoreline. A trailing end 116 of the water-land conveyor 18 is supported by a transfer trestle 118 which includes stairs 120 and a walkway 122 for connecting a catwalk 124 of the water-land conveyor unit 18 to the land 22. Likewise, a land conveyor 126 onto which the sand, gravel and other material is deposited for processing on land 22 is shown extending generally perpendicularly to the water-land conveyor unit. A water supported leading end 128 of the water-land conveyor unit 18 is cardanically connected with the coupler 32 to the trailing end 74 of the adjacent floating conveyor unit 12. Furthermore, the water-land conveyor unit 18 can be secured by cables 28 or otherwise anchored as is well known by one of ordinary skill in the art.

The floating conveyor system 10 of this invention can advantageously be adapted or changed in length by adding or subtracting individual conveyor units 12 in the system without pulling the entire system 10, including the floating dredge 14, to shore as was required in the prior art conveyor system 42. Specifically, the coupler 32 between adjacent conveyor units 12 or the conveyor unit 12 and the floating dredge 14 can be disconnected and an additional conveyor unit 12 inserted therein and coupled to the adjacent units 12. Furthermore, individual conveyor units 12 can be removed in a likewise manner without pulling the conveyor system 10 ashore.

From the above disclosure of the general principles on the present invention and the preceding detailed description of preferred embodiments, those skilled in the art will readily comprehend the various modifications to which the present invention is susceptible. As for example, the specific coupler and drawbar configuration may be modified into a different structural assembly while remaining within the scope of this invention. Therefore, I desire to be limited only by the scope of the following claims and equivalents thereof.

I claim:

1. A system for transporting material from a floating dredge to a land based station, the system comprising:

a plurality of individual serially connected conveyor units, each said unit having a conveyor for transporting the material thereon;

a coupler between adjacent said conveyor units, each said coupler cardanically joining said adjacent conveyor units to permit independent movement of said adjacent conveyor units in first and second planes which are perpendicular to each other;

a catwalk on each said conveyor unit, said catwalk including an elevated platform section at each end of said conveyor unit, each said elevated platform section mating with an elevated platform section of an adjacent conveyor unit to provide a safe walkway on and between said conveyor units; and at least one separate float on each said conveyor unit for floating said unit upon water.

2. The system of claim 1 wherein said coupler is a universal joint.

3. The system of claim 1 wherein said coupler includes a first drawbar pivotally joined to a first conveyer unit for movement within a first plane and a second drawbar rigidly fixed to a second conveyor unit adjacent to said first conveyor unit, said first and second drawbars being pivotally joined together for movement within a second plane generally perpendicular to said first plane.

4. The system of claim 1 wherein each terminal end of said conveyor units includes an end section wider than a middle section of said conveyor unit.

5. The system of claim 1 wherein said float comprises a plurality of spaced pontoons interconnected with a structural framework.

6. The system of claim 1 wherein one of said conveyor units is a water-land conveyor unit for connecting the system to the land based station, said water-land conveyor unit having a land supported end and a floating end, said floating end being anchored.

7. The system of claim 1 wherein the number of said plurality of conveyor units can be changed without bringing the system ashore.

8. The system of claim 1 wherein some of said conveyor units are of a different length than others of said conveyor units.

9. The system of claim 1 wherein a terminal end of a first conveyor overlaps a terminal end of a second conveyor for transferring the material from said first conveyor to said second conveyor.

10. The system of claim 1 further comprising:

a power lead and transfer connection on each said conveyor unit, said transfer connection being coupled to a transfer connection of an adjacent conveyor unit to transmit power between the land based station and the floating dredge.

11. The system of claim 1 wherein at least a portion of said float is positioned at a middle region of said conveyor unit.

12. A system for transporting material from a floating dredge to a land based station, the system comprising:

a plurality of individual serially connected conveyor units, each said unit having a conveyor for transporting the material thereon, a terminal end of a first conveyor overlapping a terminal end of a second adjacent conveyor for transferring the material between adjacent conveyor units;

a coupler between adjacent said conveyor units, each said coupler cardanically joining said adjacent conveyor units, said coupler including a first drawbar pivotally joined to a first conveyer unit for movement within a first plane and a second drawbar rigidly fixed to a second conveyor unit adjacent to said first conveyor unit, said first and second drawbars being pivotally joined together for movement within a second plane generally perpendicular to said first plane;

a float on each said conveyor unit for floating said unit upon water, at least a portion of said float being positioned at a middle region of said conveyor unit;

a catwalk on each said conveyor unit, said catwalk including an elevated platform section at each end of said conveyor unit, each said elevated platform section mating with an elevated platform section of said adjacent conveyor unit to provide a safe walkway on and between said conveyor units; and a power lead and transfer connection on each said conveyor unit, said transfer connection being coupled to a transfer connection of said adjacent conveyor unit for transmitting power between the floating dredge and the land based station.

13. The system of claim 12 wherein said float comprises a plurality of spaced pontoons interconnected with a structural framework.

14. The system of claim 12 wherein one of said conveyor units is a water-land conveyor unit for connecting the system to the land based station, said water-land conveyor unit having a land supported end and a floating end, said floating end being anchored.

15. The system of claim 12 wherein the number of said plurality of conveyor units can be changed without bringing the system ashore.

16. The system of claim 12 wherein some of said conveyor units are of a different length than others of said conveyor units.

* * * * *